United States Patent
Kim

(10) Patent No.: US 11,262,091 B2
(45) Date of Patent: Mar. 1, 2022

(54) METHOD OF DETERMINING REPLACEMENT TIME OF FILTER AND AIR CONDITIONER THAT DETERMINES REPLACEMENT TIME OF FILTER

(71) Applicant: LG ELECTRONICS INC., Seoul (KR)

(72) Inventor: Dae Ok Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 16/568,006

(22) Filed: Sep. 11, 2019

(65) Prior Publication Data

US 2020/0003440 A1  Jan. 2, 2020

(30) Foreign Application Priority Data

Jul. 9, 2019  (WO) ................ PCT/KR2019/008447

(51) Int. Cl.
*B01D 46/00* (2006.01)
*B01D 46/44* (2006.01)
(Continued)

(52) U.S. Cl.
CPC .......... *F24F 11/39* (2018.01); *B01D 46/0086* (2013.01); *B01D 46/2403* (2013.01);
(Continued)

(58) Field of Classification Search
CPC .......... B01D 46/0086; B01D 46/2403; B01D 46/46; B01D 46/442; B01D 46/429;
(Continued)

(56) References Cited

U.S. PATENT DOCUMENTS 4,779,456 A * 10/1988 Cantoni ............. B01D 46/0086
  73/114.31
5,572,327 A * 11/1996 Plinke ..................... G01M 3/38
  356/438

(Continued)

FOREIGN PATENT DOCUMENTS

JP  2019-39660 A  3/2019
KR  10-2018-0040977 A  4/2018
(Continued)

*Primary Examiner* — Minh Chau T Pham
(74) *Attorney, Agent, or Firm* — Birch, Stewart, Kolasch & Birch, LLP

(57) ABSTRACT

Disclosed herein is an air conditioner that determines the replacement time of a filter. The air conditioner may include a filter for filtering particles in air that is suctioned, a first camera disposed so as to monitor the state of the filter, and a controller for analyzing an image of the filter acquired from the first camera through a deep neural network model trained using machine learning in order to determine a pollution level of the filter. The controller may be configured to determine the time at which the filter is to be replaced based on at least the pollution level of the filter, and may be further configured to use information collected from other electronic devices in an Internet-of-Things environment connected as a 5G communication environment in order to determine the time at which the filter is to be replaced.

18 Claims, 7 Drawing Sheets

(51) Int. Cl.
    *F24F 11/39* (2018.01)
    *F24F 11/52* (2018.01)
    *F24F 11/63* (2018.01)
    *B01D 46/24* (2006.01)
    *B01D 46/46* (2006.01)

(52) U.S. Cl.
    CPC ........... *B01D 46/442* (2013.01); *B01D 46/46* (2013.01); *B01D 2279/50* (2013.01)

(58) Field of Classification Search
    CPC ........... B01D 46/0021; B01D 46/0047; B01D 46/24; B01D 2273/30; B01D 2279/50; F24F 11/39; F24F 8/10; F24F 11/52; F24F 11/63; F24F 2110/64
    USPC .... 55/341.1, 471, 472, 473, 385.1, DIG. 34; 95/25; 96/417
    See application file for complete search history.

(56) References Cited

U.S. PATENT DOCUMENTS

| | | | |
|---|---|---|---|
| 7,012,685 B1* | 3/2006 | Wilson | F24F 8/10 |
| | | | 356/239.1 |
| 7,416,574 B2* | 8/2008 | Udagawa | B01D 46/0001 |
| | | | 219/400 |
| 9,757,674 B2* | 9/2017 | Kwon | B01D 46/0002 |
| 9,803,909 B2* | 10/2017 | Son | G01G 19/52 |
| 2010/0077926 A1* | 4/2010 | Yamagishi | B03C 3/28 |
| | | | 96/423 |
| 2010/0165186 A1* | 7/2010 | Kawai | G02B 26/007 |
| | | | 348/375 |
| 2013/0291786 A1* | 11/2013 | Jeong | G01D 7/005 |
| | | | 116/201 |
| 2017/0284927 A1 | 10/2017 | Hamann et al. | |

FOREIGN PATENT DOCUMENTS

| | | |
|---|---|---|
| KR | 10-2018-0051328 A | 5/2018 |
| KR | 10-2019-0004074 A | 1/2019 |
| KR | 10-1927587 B1 | 3/2019 |
| KR | 10-2019-0059721 A | 5/2019 |

* cited by examiner

METHOD OF DETERMINING REPLACEMENT TIME OF FILTER AND AIR CONDITIONER THAT DETERMINES REPLACEMENT TIME OF FILTER

CROSS-REFERENCE TO RELATED APPLICATION

This present application claims benefit of priority to PCT Patent Application No. PCT/KR2019/008447, entitled "METHOD OF DETERMINING REPLACEMENT TIME OF FILTER AND AIR CONDITIONER THAT DETERMINES REPLACEMENT TIME OF FILTER," filed on Jul. 9, 2019, in the World Intellectual Property Organization, the entire disclosure of which is incorporated herein by reference.

BACKGROUND

1. Technical Field

The present disclosure relates to a method of determining the replacement time of a filter and an air conditioner that determines the replacement time of a filter, and more particularly to a method of determining the replacement time of a filter that is suitable for each apparatus in consideration of the pollution level of a filter in each apparatus, rather than a fixed criterion, and an air conditioner that determines the replacement time of a filter that is suitable for each apparatus in consideration of the pollution level of a filter in each apparatus, rather than a fixed criterion.

2. Description of Related Art

In accordance with an increase in air pollution and climatic changes, an air conditioner, which is configured to control an indoor air environment, has become an essential electric appliance for houses and offices.

The air conditioner is operated according to the principle by which the air conditioner suctions external air that is polluted, purifies the polluted air using a filter, and discharges clean air to the outside. After the air conditioner operates for a certain length of time, therefore, pollutants are cumulatively attached to the filter, whereby the purification performance of the air conditioner may deteriorate. In this case, it is necessary to exchange or clean the filter of the air conditioner in order to recover the original purification performance of the air conditioner.

In connection with the replacement time of a filter of an air purifier, which is a kind of air conditioner, Korean Patent Registration No. 1,927,587, entitled "Air purifier and method of determining cleaning or replacement time of filter of air purifier," discloses technology for measuring a difference in dust concentration values using a dust concentration sensor for measuring the concentration of dust in a space surrounding the air purifier, and determining a change in the purification capability index of the air purifier in order to determine cleaning or replacement of the filter.

In the above document, the concentration of dust around the air purifier is measured, and the purification capability index of the air purifier is determined based on the measured concentration of dust, thereby indirectly estimating the state of the filter in order to determine the replacement time of the filter. Since the performance of the air purifier may deteriorate due to causes other than the pollution of the filter, however, it may not be possible to accurately predict the state of the filter only based on the above technology.

Meanwhile, Korean Patent Application Publication No. 2019-0004074 entitled "Air conditioner and method of operating the same", discloses technology in which an infrared lamp for emitting infrared light toward a filter and an infrared sensor for sensing the infrared light that has passed through the filter are provided, and the time at which it is necessary to replace a filter is determined based on the amount of infrared light that has passed through the filter.

In the above document, the amount of pollutants that are cumulatively attached to the filter is indirectly estimated based on the amount of infrared light that has passed through the filter in order to determine the time at which it is necessary to replace the filter. Since the pollution level of the filter is not directly determined, however, accuracy may be lowered.

The expense incurred in replacing the filter is one of the main expenses incurred in maintaining the air conditioner. In the case in which the filter is not replaced at the right moment, the performance of the air conditioner may not be effectively exhibited. Therefore, there is a need for technology that is capable of more accurately determining the replacement time of the filter.

The above information disclosed in this Background section is provided only for enhancement of understanding of the background of the present disclosure, and therefore it may contain information that does not constitute prior art that is already known in this country to a person of ordinary skill in the art.

SUMMARY OF THE INVENTION

The present disclosure is directed to addressing the issue in which an air conditioner determines the replacement time of a filter in a fixed cycle irrespective of the state in which the filter is actually used, whereby the filter is used for a longer time or a shorter time than the time at which the filter is to be appropriately replaced.

The present disclosure is further directed to addressing the issue in which an air conditioner sets the replacement time of a filter only to a fixed period irrespective of the amount of time during which the air conditioner is actually used and the environment in which the air conditioner is used, whereby it is not possible for the air conditioner to inform a user of the correct time at which the filter is to be replaced.

The present disclosure is further directed to addressing the issue in which an air conditioner determines the replacement time of a filter only based on the approximate pollution level of the filter without accurately evaluating the overall pollution level of the filter, whereby it is not possible for the air conditioner to inform a user of the correct time at which the filter is to be replaced, which is necessary for the air conditioner.

The present disclosure is further directed to addressing the issue in which it is difficult to secure training data necessary to generate a deep neural network model for determining the pollution level of a filter.

The present disclosure is further directed to addressing the issue in which, in a situation in which not only a filter provided in a suction port but also a filter provided in discharge port becomes polluted due to dust accumulation, it is not possible to monitor the pollution level of the discharge port.

An aspect of the present disclosure is to provide a method and apparatus for checking the actual state of a filter using a camera configured to monitor the filter, and determining the pollution level of the filter in order to more accurately predict the time at which the filter is to be replaced.

Another aspect of the present disclosure is to provide a method and apparatus for predicting the state of a filter in consideration of the amount of time during which an air conditioner is used and the environment in which the air conditioner is used, in addition to the current actual state of the filter, in order to inform a user of the replacement time of the filter.

Another aspect of the present disclosure is to provide a method and apparatus for dividing a filter into a plurality of areas each having a predetermined size, and informing a user that it is necessary to replace the filter when the number of areas having pollution levels exceeding a predetermined level is equal to or greater than a predetermined value.

A further aspect of the present disclosure is to provide a method and apparatus for dividing a polluted filter into a plurality of areas each having a predetermined size, and labeling a pollution level for each area in order to generate training data for a deep neural network model.

An air conditioner that determines the replacement time of a filter according to an embodiment of the present disclosure may include a filter for filtering particles in air that is suctioned, a first camera disposed so as to monitor the state of the filter, and a controller for analyzing an image of the filter acquired from the first camera in order to determine the pollution level of the filter.

The controller may be configured to determine a time at which the filter is to be replaced based on at least the pollution level of the filter.

In addition, the controller may be configured to determine the time at which the filter is to be replaced based on at least the pollution level of the filter and information about the use of the air conditioner during a predetermined period, and the information about the use of the air conditioner during the predetermined period may include at least one of the time during which the air conditioner has been operated during the predetermined period, information about the air pollution level sensed by the air conditioner during the predetermined period, or information about the amount of power that the air conditioner has consumed during the predetermined period.

An air conditioner according to another embodiment of the present disclosure may further include a receiver for receiving information about the air pollution level of a region in which the air conditioner is installed.

The controller may be configured to determine the time at which the filter is to be replaced in further consideration of the information about the air pollution level of the region.

In addition, the receiver may receive data about the air pollution level of the region in which the air conditioner is installed that has been cumulatively stored from the past, and the controller may be configured to determine the time at which the filter is to be replaced in further consideration of data about the air pollution level during a predetermined period after an identical date of a previous year to the current date, among the data about the air pollution level of the region that has been cumulatively stored from the past.

In addition, the controller may be configured to divide the image of the filter acquired from the first camera into a plurality of areas each having a predetermined size, to determine the pollution level for each area, and to generate a replacement alarm signal when the number of areas of the filter having pollution levels exceeding a predetermined level is equal to or greater than a predetermined value.

An air conditioner according to another embodiment of the present disclosure may include a memory for storing a model trained through machine learning so as to predict the pollution level based on features of the image of the filter.

Here, an image of a polluted filter may be divided into a plurality of areas each having a predetermined size, and the model stored in the memory may be trained through supervised learning using data having a pollution level value labeled for each area.

The controller may be configured to derive the pollution level of the filter from the image of the filter acquired from the first camera using the model stored in the memory.

In addition, the filter may have a cylindrical shape at the center of which a cavity is defined, and the first camera may be disposed in the cavity so as to monitor the state of the filter while being rotated.

An air conditioner according to another embodiment of the present disclosure may further include an illuminator disposed in the cavity of the filter so as to illuminate the interior of the filter.

An air conditioner according to a further embodiment of the present disclosure may further include a second camera disposed so as to monitor an air discharge port of the air conditioner.

The controller may analyze an image of the air discharge port acquired from the second camera in order to determine the pollution level of the air discharge port, and may generate a cleaning request signal when the pollution level of the air discharge port is equal to or higher than a predetermined level.

A method of determining the replacement time of a filter in an air conditioner according to an embodiment of the present disclosure may include collecting an image of the filter through a first camera disposed so as to monitor the filter, determining the pollution level of the filter by analyzing the collected image of the filter, and determining the time at which the filter is to be replaced based on at least the pollution level of the filter.

The determining the time at which the filter is to be replaced may include determining the time at which the filter is to be replaced based on at least the pollution level of the filter and information about the use of the air conditioner for a predetermined period, and the information about the use of the air conditioner during the predetermined period may include at least one of the time during which the air conditioner has been operated during the predetermined period, information about the air pollution level sensed by the air conditioner during the predetermined period, or information about the amount of power that the air conditioner has consumed during the predetermined period.

A method of determining the replacement time of a filter according to another embodiment of the present disclosure may further include receiving information about the air pollution level of a region in which the air conditioner is installed, before the determining the time at which the filter is to be replaced.

The determining the time at which the filter is to be replaced may include determining the time at which the filter is to be replaced in further consideration of the information about the air pollution level of the region.

A method of determining the replacement time of a filter according to another embodiment of the present disclosure may further include receiving data about the air pollution level of the region in which the air conditioner is installed that has been cumulatively stored from the past, before the determining the time at which the filter is to be replaced.

The determining the time at which the filter is to be replaced may include determining the time at which the filter is to be replaced in further consideration of data about the air pollution level during a predetermined period after an identical date of a previous year to the current date, among the data about the air pollution level of the region that has been cumulatively stored from the past.

The determining the pollution level of the filter may include dividing the image of the filter collected through the first camera into a plurality of areas each having a predetermined size, and determining the pollution level for each area.

A method of determining the replacement time of filter according to another embodiment of the present disclosure may further include generating a replacement alarm signal when the number of areas of the filter having pollution levels exceeding a predetermined level is equal to or greater than a predetermined value, after the determining, the pollution level of the filter.

A method of determining the replacement time of a filter according to a further embodiment of the present disclosure may further include collecting an image of an air discharge port of the air conditioner through a second camera disposed so as to monitor the air discharge port, and determining the pollution level of the air discharge port by analyzing the image of the air discharge port collected from the second camera and generating a cleaning request signal when the pollution level of the air discharge port is equal to or higher than a predetermined level.

In addition, there may be further provided other methods for realizing the present disclosure, other systems for realizing the present disclosure, and a computer program for performing the above methods.

Other aspects, advantages and features not described above will be more apparent with reference to the following detailed description of example embodiments in connection with the accompanying drawings, and the appended claims.

Through an air conditioner that determines the replacement time of a filter and a method of determining the replacement time of a filter according to embodiments of the present disclosure, it is possible to inform a user of the appropriate replacement time of the filter based on the state in which the filter is actually used.

Further, through the air conditioner that determines the replacement time of a filter and the method of determining the replacement time of a filter according to embodiments of the present disclosure, it is possible to inform a user of the correct time at which the filter is to be replaced in consideration of the amount of time during which the air conditioner is actually used and the environment in which the air conditioner is used.

Further, through the air conditioner that determines the replacement time of a filter and the method of determining the replacement time of a filter according to embodiments of the present disclosure, it is possible to accurately evaluate the overall pollution level of the filter in order to determine the replacement time of the filter, whereby it is possible to inform a user of the correct time at which the filter is to be replaced, which is necessary for the air conditioner.

Further, through the air conditioner that determines the replacement time of a filter and the method of determining the replacement time of a filter according to embodiments of the present disclosure, it is possible to more easily secure training data necessary to generate a deep neural network model for determining the pollution level of the filter.

Further, through the air conditioner that determines the replacement time of a filter and the method of determining the replacement time of a filter according to embodiments of the present disclosure, it is possible to monitor the pollution level not only of the filter, which is provided in a suction port, but also of a discharge port.

Effects of the present disclosure are not limited to the effects mentioned above, and other unmentioned effects will be clearly understood by those skilled in the art from the above description of the present disclosure.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
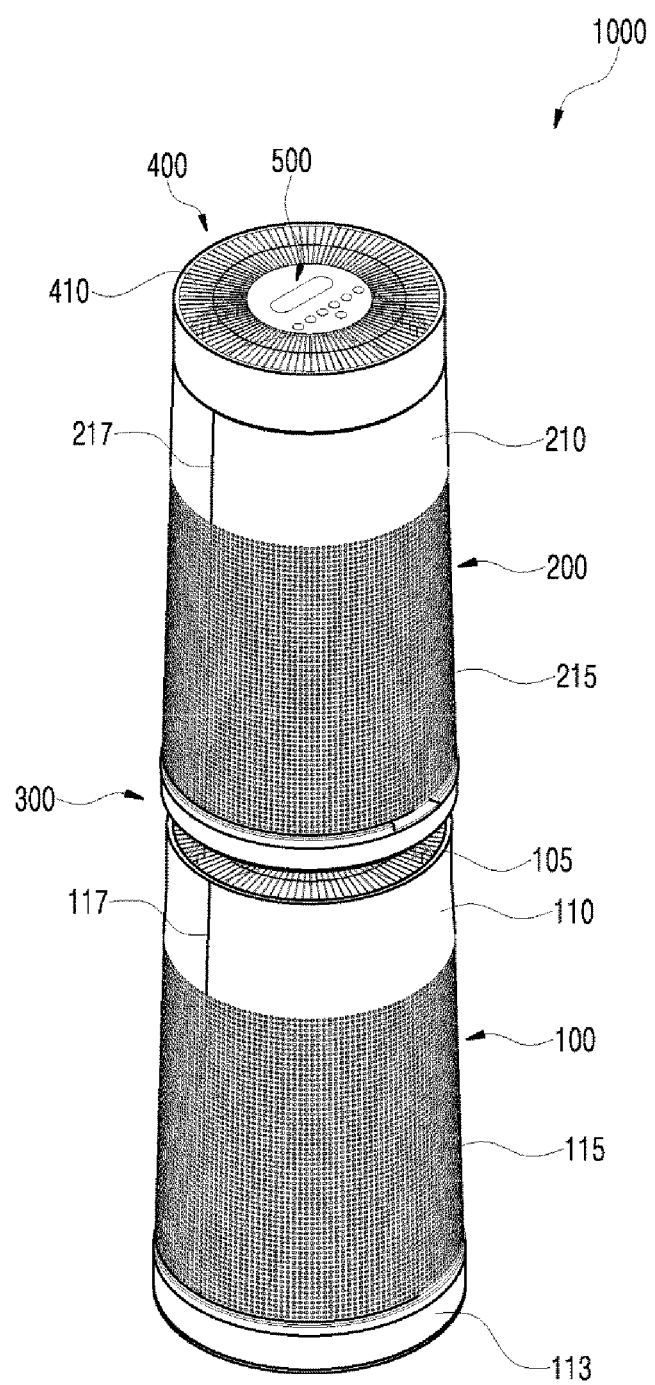
FIG. 1 is a diagram illustrating an air conditioner according to an embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms complete understanding of the present disclosure to include the plural forms as well, unless the context clearly indicates otherwise. The terms "comprises," "comprising." "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second,"

and other numerical terms may be used herein only to describe various elements, but these elements should not be limited by these terms. Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

An air conditioner according to embodiments of the present disclosure may refer to an apparatuses such as an air purifier, an air conditioner, a humidifier, or a ventilator, which are capable of controlling an air environment. However, for convenience of description, the air conditioner will be described below as an air purifier by way of example.

FIG. 1 is a diagram illustrating an air conditioner according to an embodiment of the present disclosure. An air purifier 1000 according to an embodiment of the present disclosure may include a first air blowing device 100, a second air blowing, device 200, and an air blow direction adjustment device 400 for adjusting the direction of air generated by the air blowing devices 100 and 200.

The first air blowing device 100 may include a first case 110, which defines the exterior thereof.

The first case 110 may be provided with a first air suction net 115, through which external air is suctioned. The first case 110 may be divided into two parts. When the first case 110 is coupled to the first air blowing device 100, a coupling line 117 may be formed between the two parts of the first case 110. A first air discharge port 105 may be disposed above the first air blowing device 100. In addition, a base 113, which serves as a support, may be provided at the bottom of the first air blowing device 100.

When external air is introduced into the first air blowing device 100 through the first air suction net 115 of the first air blowing device 100, pollutants may be removed from the air as the air passes through a filter in the first air blowing device 100, and the air from which the pollutants have been removed, that is the cleaned air, may be discharged to the outside through the first air discharge port 105.

As shown in FIG. 1, the second air blowing device 200 may be disposed above the first air blowing device 100.

The second air blowing device 200 may include a second case 210, which defines the exterior thereof.

The second case 210 may be provided with a second air suction net 215, through which external air is suctioned. The second case 210 may be divided into two parts. When the second case 210 is coupled to the second air blowing device 200, a coupling line 217 may be formed between the two parts of the second case 210. The air blow direction adjustment device 400 may be disposed above the second air blowing device 200. An air blow port 410 may be disposed in the upper part of the air blow direction adjustment device 400. External air is introduced into the second air blowing device 200 through the second air suction net 215 of the second air blowing device 200, and then the air is cleaned while passing through a filter in the second air blowing device 200. Although not shown in FIG. 1, the purified air is discharged to the outside through a second air discharge port formed in the second air blowing device 200. At this time, the air is discharged in an appropriate direction by the air blow direction adjustment device 400. A fan is provided in the air blow direction adjustment device 400, by which the purified air may be discharged a long distance.

An interface 500 for interaction with a user may be disposed at the upper end of the air blow direction adjustment device 400. The interface 500 may include a display, a button, a speaker, and a microphone. The user may adjust the air purifier 1000 through the interface 500, and may be informed of the state of the air purifier 1000 through the interface 500.

In particular, the air purifier 1000 according to this embodiment of the present disclosure may inform the user of information indicating, whether it is necessary to replace the filters in the first air blowing device 100 and the second air blowing device 200, through the interface 500.

Figure 2:
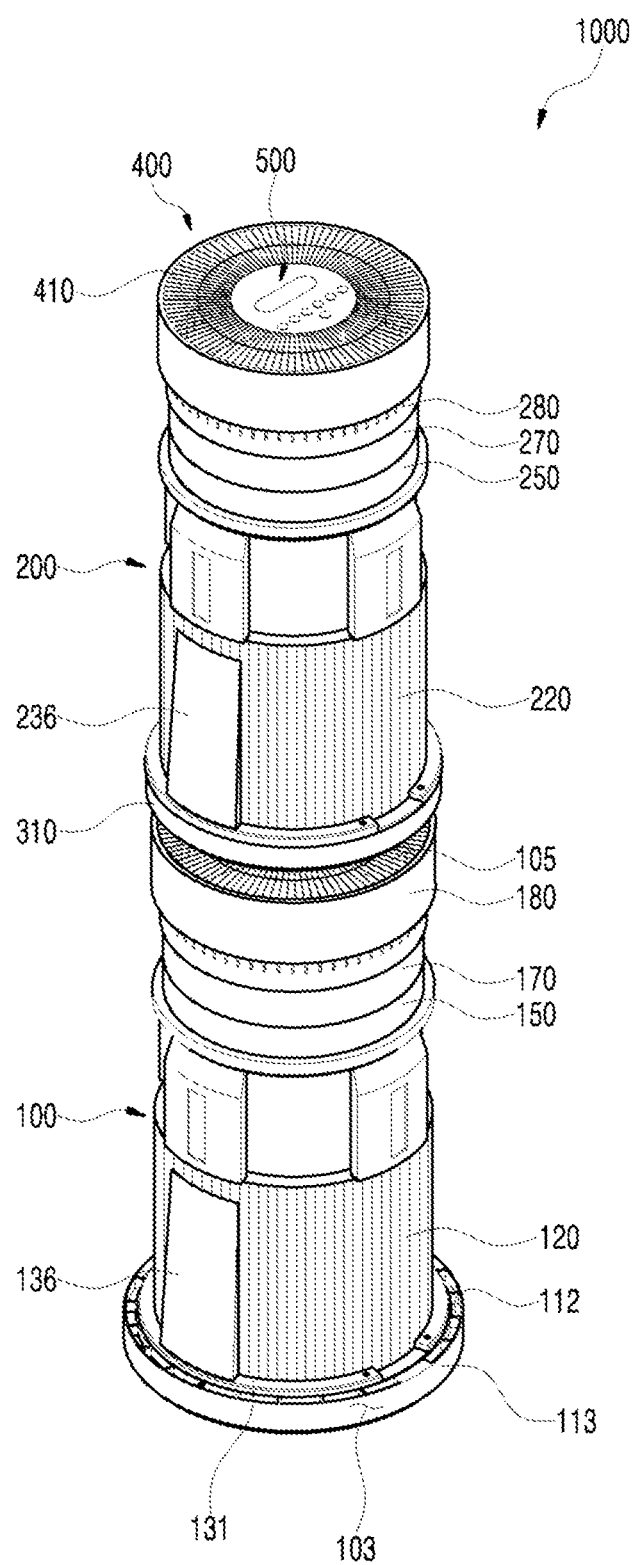
FIG. 2 is a diagram illustrating the interior of the air conditioner according to an embodiment of the present disclosure.

FIG. 2 is a diagram illustrating the interior of the air conditioner according to an embodiment of the present disclosure.

When the cases are removed from the air purifier 1000 of FIG. 1, the interior of the air purifier 1000 is visible, as shown in FIG. 2.

A first filter 120 may be disposed in the first air blowing device 100, for filtering particles in air suctioned into the first air blowing device 100 in order to remove pollutants from air introduced into the first air blowing device 100 from the outside. In the same manner, a second filter 220 for removing pollutants from air introduced into the second air blowing device 200 from the outside may be disposed in the second air blowing device 200.

The pollutants removed from the air become attached to the first filter 120 and to the second filter 220. When the air purification operation is performed for a long time, therefore, the first filter 120 and the second filter 220 become excessively polluted. When the level of pollution of the first filter 120 and the second filter 220 reaches a predetermined level, the first filter 120 and the second filter 220 may not properly function. In this case, it is necessary to wash or replace the first filter 120 and the second filter 220.

However, the time taken for the filters to become polluted to the extent that it is necessary to wash or replace the filters may vary depending on factors such as the time during which the air purifier 1000 is operated, the mode in which the air purifier 1000 is operated, and the air pollution level in the environment in which the air purifier 1000 is operated.

In order for the air purifier 1000 to function as designed, therefore, it is necessary to wash or replace the filters at the necessary time. However, both washing and replacement consume time and resources of the user. When the filters are washed or replaced at a time earlier than the necessary time, resources may be wasted.

In embodiments of the present disclosure, therefore, the first filter 120 and the second filter 220 are directly monitored in order to determine the pollution state thereof, whereby it is possible to more accurately inform the user of the washing or replacement time of the filters.

The base 113 of the air purifier 1000 may include an inner frame 131, an outer frame 103, and a base suction unit 112. A first supporter 136 may be disposed in the first air blowing device 100, and the first filter 120 may be disposed over the first supporter 136.

A first air blow connector 150, a first air blow guide 170, a first fan housing 180, a first discharge guide 190, and a first upper discharge port 105 may be disposed at the upper part of the first air blowing device 100. A fan may be installed in the first fan housing 180 so as to be rotatable such that air can be more actively introduced into the first air blowing device 100 due to the flow of air generated by the fan.

The second air blowing device 200 may be disposed above the first air blowing device 100, and the first air blowing device 100 and the second air blowing device 200 may be separated from each other by a separation plate 310.

A second supporter 236 may be disposed in the second air blowing device 200, and the second filter 220 may be disposed over the second supporter 236.

A second air blow connector 250, a second air blow guide 270, and a second fan housing 280 may be disposed at the upper part of the second air blowing device 200. A fan may be installed in the second fan housing 280 so as to be rotatable such that air can be more actively introduced into the second air blowing device 200 due to the flow of air generated by the fan, and such that air can be more effectively blown to the air blow direction adjustment device 400 due to the flow of air generated by the fan.

Figure 3:
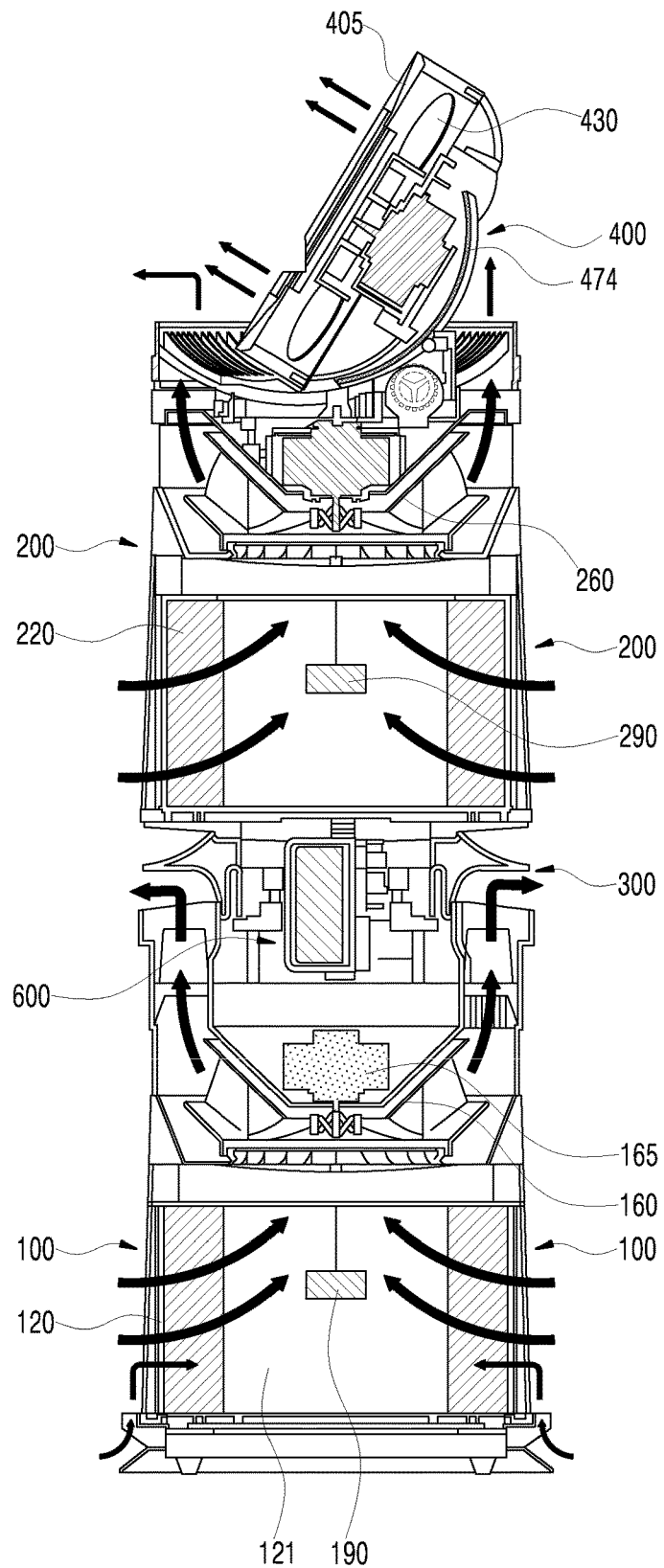
FIG. 3 is a sectional diagram illustrating the flow of air in the air conditioner according to an embodiment of the present disclosure.

FIG. 3 is a sectional diagram illustrating the flow of air in the air conditioner according to an embodiment of the present disclosure.

A first fan 160, a first motor 165 for driving the first fan, and a printed circuit board (PCB) 600 may be disposed in the first air blowing device 100. External air is introduced into the first air blowing device 100 due to the flow of air generated as the result of the first fan 160 being rotated by the first motor 165.

The introduced air passes through the first filter 120 so as to be filtered, and pollutants may become attached to the first filter 120. The air that passes through the first filter 120 and is introduced into a cavity 121 defined in the first filter 120 has higher purity than external air. The purified air may move upwards, and may then be discharged to the outside through a first outer discharge port 300.

The first filter 120 may be configured to have a cylindrical shape at the center of which a cavity 121 is defined, and a first inner camera 190 for monitoring the state of the first filter 120 may be disposed in the cavity 121. The first inner camera 190 may capture an image of the overall state of the first filter 120 while rotating in the cavity.

As the first air blowing device 100 is operated for a long time or is operated in an environment having a large amount of pollutants, the pollution level of the first filter 120 increases, which may be monitored by the first inner camera 190.

Although not shown in FIG. 3, an illuminator for illuminating the interior of the filter in order to assist the first inner camera 190 in capturing an image may be disposed in the first filter 120. The illuminator may be rotated together with the rotation of the first inner camera 190, and may be configured to illuminate the entire interior of the filter.

The image of the filter acquired by the first inner camera 190 may be analyzed by a controller of the air purifier 1000, whereby the pollution level of the filter may be determined. In the case in which the pollution level of the filter is equal to or higher than a predetermined level (a predetermined pollution level at which it is necessary to wash or replace the filter), an alarm indicating that the filter must be replaced may be generated.

Whether the pollution level of the filter is equal to or higher than a predetermined level may be determined through image analysis of an image of the filter before becoming polluted, that is, a clean filter, and images of the filter that has been polluted to various levels, using a deep neural network model pre-trained through training data having labeled pollution levels.

The controller of the air purifier 1000 may also determine the pollution level of the filter based on an image of the filter in the current state through the pre-trained deep neural network model in order to determine when to replace the filter.

In the same manner as in the first air blowing device 100, a second fan 260 may be disposed at the upper part of the second air blowing device 200 such that external air can be introduced into the second air blowing device 200 due to the flow of air generated by the second fan 260.

The air introduced into the second air blowing device 200 passes through the second filter 220 so as to be filtered, and pollutants may become attached to the second filter 220.

The air purified through the second filter 220 may be discharged upwards from the second air blowing device 200, and may then be sent in a desired direction through the air blow direction adjustment device 400.

The air blow direction adjustment device 400 may include a rear protector 474, a third fan 430, and an air blow port 405. The filtered air that is discharged from the second air blowing device 200 may pass through the air blow direction adjustment device 400 by driving the third fan 430, and may then be discharged in a desired direction through the air blow port 405.

In the same manner as in the first filter 120, a second inner camera 290 for monitoring the state of the second filter 220 may be disposed in the second filter 220. The second inner camera 290 may monitor the entire interior of the second filter 220 while rotating. Alternatively, the second inner camera 290 may include a plurality of cameras, which may be configured to simultaneously monitor the interior of the second filter 220 in several directions.

Although not shown in FIG. 3, separate cameras may be installed in the air discharge ports of the first air blowing device 100 and the second air blowing device 200 in order to monitor the air discharge ports.

The pollution level of the air discharge ports may be determined based on images of the air discharge ports acquired by the cameras for monitoring the air discharge ports. When the pollution level of the air discharge ports is equal to or higher than a predetermined level, a signal indicating that it is necessary to clean the air discharge ports may be generated.

Whether the pollution level of each of the air discharge ports is equal to or higher than a predetermined level may be determined through image analysis of an image of the air discharge port before being polluted, that is, a clean air discharge port, and images of the air discharge port that has been polluted to various levels, using a deep neural network model pre-trained through training data having labeled pollution levels.

Figure 4:
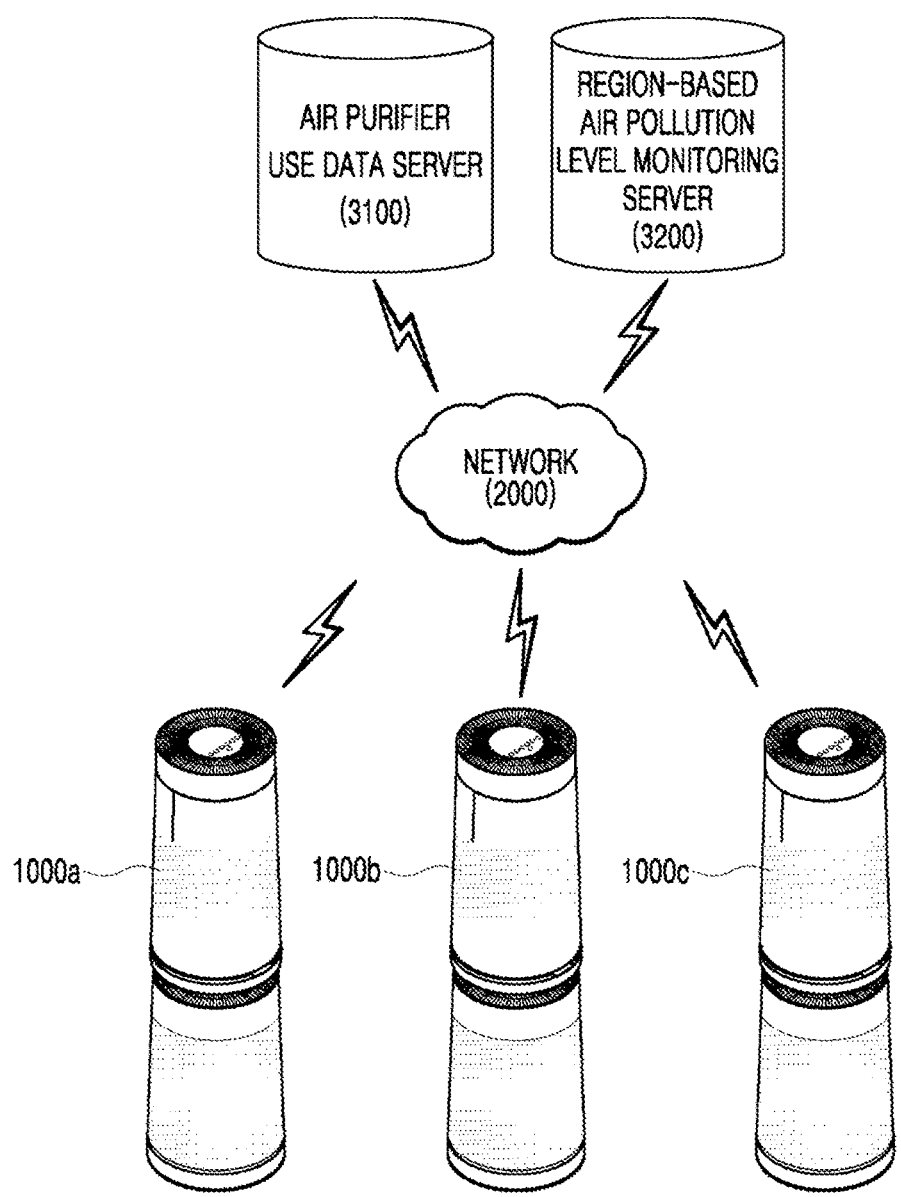
FIG. 4 is a diagram illustrating air conditioners according to an embodiment of the present disclosure operating in an environment in which the air conditioners are operatively connected to external servers.

FIG. 4 is a diagram illustrating air conditioners according to an embodiment of the present disclosure operating in an environment in which the air conditioners are operatively connected to external servers.

The air purifiers 1000a, 1000b, and 1000c according to this embodiment of the present disclosure may communicate with the external servers 3100 and 3200 over a network 2000. The external servers, with which the air purifiers 1000a, 1000b, and 1000b communicate, may be an air purifier use data server 3100 for storing data on the use of the air purifiers and a region-based air pollution level monitoring server 3200 for providing information on the air pollution level of regions in which the air purifiers are located.

The air purifier use data server 3100 may store information about the times during which the air purifiers have been operated during a predetermined period, information about the air pollution level sensed by sensors of the air purifiers during the predetermined period, and information about the amount of power that the air purifiers have consumed during the predetermined period.

The above information may be stored in the air purifier use data server 3100, or may be stored in each of the air purifiers.

It is possible to predict the extent to which the filters of the air purifiers have performed filter functions (how long the filters have been operated and how much polluted air the filters have filtered) based on the above information, which may be additional information for determining the replacement time of the filters.

The controller of each air purifier may probabilistically determine the pollution level of the filter through the deep neural network model. The above information, that is, the information indicating the amount of time during which the filter has been used, may assist in determining the pollution level of the filter with high reliability.

The region-based air pollution level monitoring server 3200 is a server for cumulatively storing information about the region-based air pollution level (values of fine dust, ultra fine dust, and ozone by date and time). The region-based air pollution level monitoring server 3200 may receive information about the position at which each air purifier is located from the air purifiers, and may transmit information about the air pollution level of the region including the position of the corresponding air purifier to the air purifiers.

The controller of the air purifier may examine the operation history of the air purifier based on the information about the pollution level of the region in which the air purifier is located in order to determine the pollution level of the filter in a more sophisticated manner.

The air purifier may receive, from the region-based air pollution level monitoring server 3200, data about the air pollution level of the region in which the air purifier is installed that has been cumulatively stored from the past, and the received information may be data about the air pollution level during a predetermined period after the same date of the previous year as the current date at which the air purifier determines that it is necessary to replace the filter thereof.

In an example, in the case in which an air purifier installed in a house located in Umyeon-dong, Seocho-gu, Seoul, Korea determines that it is necessary to replace a filter thereof on Jul. 7, 2019, the air purifier may receive, from the region-based air pollution level monitoring server 3200, data about the air pollution level from Jul. 7, 2018 to Oct. 7, 2018 so as to predict the air pollution level for the three months after the current time, and calculate the period during which the filter is usable based on the prediction.

In another example, in the case in which an air purifier installed in a house located in Umyeon-dong, Seocho-gu, Seoul, Korea determines that it is necessary to replace a filter thereof on Jul. 7, 2019, the air purifier may receive, from the region-based air pollution level monitoring server 3200, data about the air pollution level from Jul. 7, 20185 to Oct. 7, 2015, from Jul. 7, 2016 to Oct. 7, 2016, from Jul. 7, 2017 to Oct. 7, 2017, and from Jul. 7, 2018 to Oct. 7, 2018, calculate the average value of the air pollution levels during the periods so as to predict the air pollution level for the three months after the current time and may calculate the period during which the filter is usable based on the prediction.

In addition, information about the use of the air purifiers 1000a, 1000b, and 1000c may be cumulatively stored in the air purifier use data server 3100. Information about the time at which the filters were washed and replaced in the air purifiers may be included in the information about the use of the air purifiers.

The information about the use of the air purifiers 1000a, 1000b, and 1000c may be used to inform other air purifiers of the time at which it is necessary to replace the filter.

In addition, the air purifier use data server 3100 may transmit information about whether the amount of time during which each air purifier has been used is equal to or greater than an average or less than the average, based on the information about the use of the air purifiers.

Figure 5:
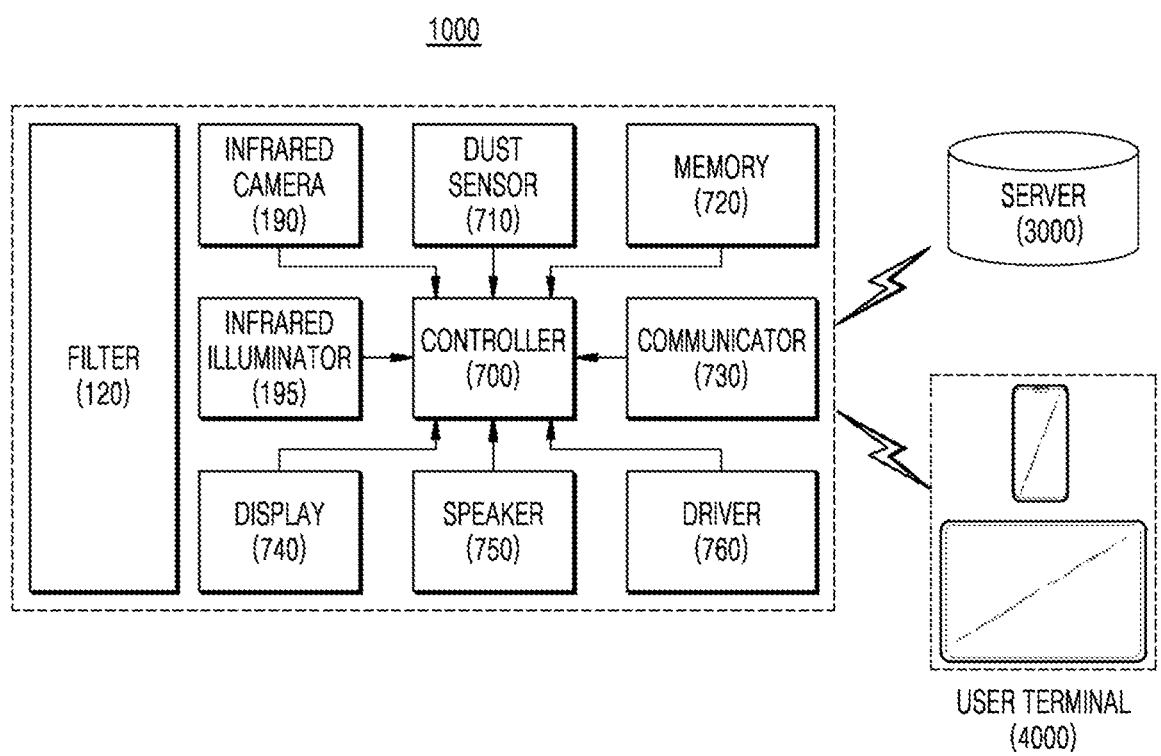
FIG. 5 is a block diagram showing the air conditioner according to an embodiment of the present disclosure.

FIG. 5 is a block diagram showing the air conditioner according to an embodiment of the present disclosure.

The air purifier 1000 may include a filter 120 for filtering suctioned air, an infrared camera 190 for monitoring the filter, an infrared illuminator 195 for assisting the infrared camera to capture an image, a dust sensor 710 for sensing the pollution level of external air, a display 740 and a speaker 750 for informing of information about the state of the air purifier 1000 and the time at which it is necessary to replace the filter, a driver 760 for driving respective components of the air purifier 1000, a communicator 730 for communicating with an external apparatus, a memory 720 for storing various kinds of information about the air purifier 1000 and a learning model for filter replacement time determination, and a controller 700 for communicating with the above components and controlling the above components.

The air purifier 1000 may communicate with an external server 3000 and with a user terminal 4000 through the communicator 730.

The controller 700 of the air purifier 1000 may determine the pollution level of the filter based on an image of the filter acquired by the infrared camera 190, and may determine when it is necessary to replace the filter. In addition, the controller may inform the user of the result of determination through the speaker 750 or through the display 740.

Figure 6:
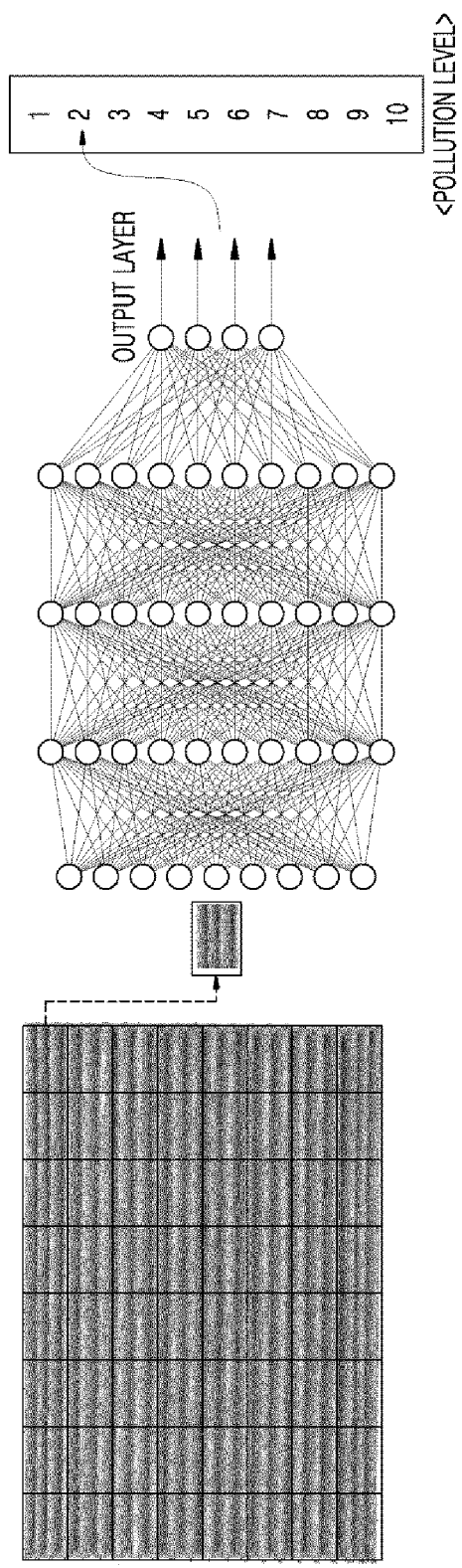
FIG. 6 is a diagram illustrating a deep neural network model for determining the state of a filter in the air conditioner according to an embodiment of the present disclosure.

FIG. 6 is a diagram illustrating a deep neural network model for determining the state of the filter in the air conditioner according to the embodiment of the present disclosure.

As shown in FIG. 6, an image of the entire filter may be divided into a plurality of areas each having a predetermined size, and the pollution level for each area may be determined to be one of level 1 to level 10 through a pre-trained deep neural network model.

The controller 700 may determine the pollution level for each area, and when the number of areas having pollution levels exceeding a predetermined level is equal to or greater than a predetermined value, the controller 700 may generate a signal indicating that it is necessary to replace the filter.

Here, the deep neural network model of artificial intelligence that determines the pollution level for each area of the filter may be trained through supervised learning.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights: and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training, data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

An ANN may be classified as a single-layer neural network or a multi-layer neural network, based on the number of layers therein.

An example of an artificial neural network using non-GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined: third, which actions the agent should choose to get rewards and which actions to choose to get penalties are defined; and fourth, the agent iterates until future reward is maximized, thereby deriving an optimal policy.

Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction.

Adam may include a method that combines momentum and RMSProp and increases optimization accuracy in SGD by adjusting the step size and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

More specifically, in order to train a deep neural network model according to an embodiment of the present disclosure, an image of a filter that is not polluted, that is, a clean filter, images of filters that have been variously polluted, and training data having pollution levels labeled from level 0 to level 10 may be prepared.

Since it may be difficult to secure a plurality of filter images for a large amount of training data, a single filter image may be divided into a plurality of areas each having a predetermined size, the pollution level may be labeled for each area, and the image of each area may be used as training data.

It is possible to acquire a plurality of training data from a single filter image through the above scheme, whereby effective supervised learning is possible.

Figure 7:
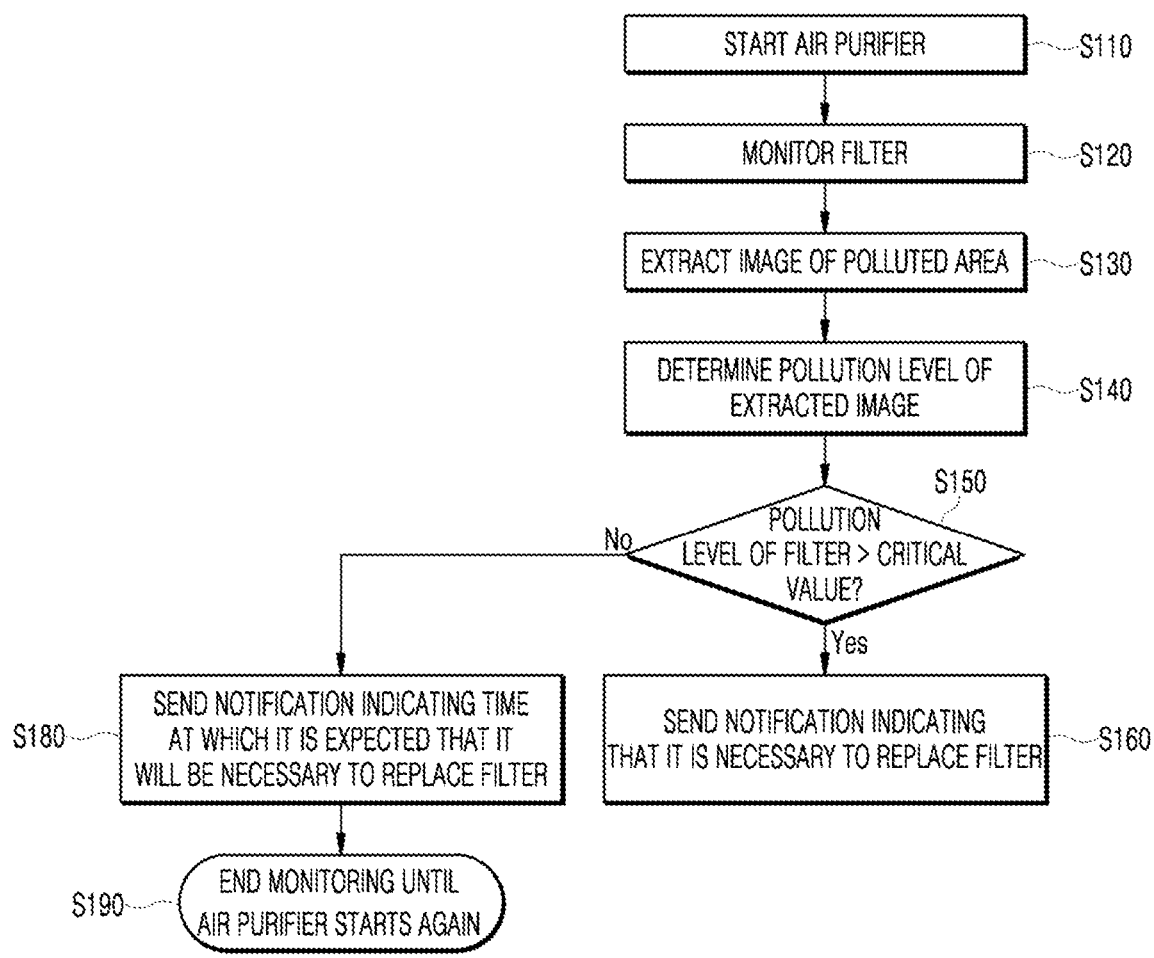
FIG. 7 is a flowchart showing a method of determining the replacement time of a filter according to an embodiment of the present disclosure.

FIG. 7 is a flowchart showing a method of determining the replacement time of a filter according to an embodiment of the present disclosure.

First, the air purifier 1000 may be started for use (S110). The controller 700 of the started air purifier 1000 may control the camera 190 for monitoring the filter 120 (S120). An image of a polluted area may be extracted from an image captured by the camera 190 (S130).

The pollution level of the filter may be determined from the extracted image of the polluted area using the pre-trained deep neural network model described above (S140). When the pollution level of the filter exceeds a critical value, for example, when the number of areas having pollution levels exceeding a predetermined level is equal to or greater than a predetermined value (70% of the entire area of the filter), a notification indicating that it is necessary to replace the filter may be sent (S150 and S160). When the pollution level of the filter does not exceed the critical value, the time at which it is expected that it will be necessary to replace the filter may be calculated, and then a notification may be sent (S180). The time at which it is expected that it will be necessary to replace the filter may be calculated by predicting an additional pollution degree using data about the air pollution level of the region in the past, as described above. A separate trained deep neural network model may also be utilized in order to predict the time during which the filter is usable for such a calculation.

After informing a user of the time at which it is expected that it will be necessary to replace the filter, the air purifier 1000 may end monitoring until the air purifier is started again (S190). However, the controller 700 of the air purifier 1000 may be configured to continuously monitor the state of the filter even after informing the user of the time at which it is expected that it will be necessary to replace the filter.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

What is claimed is:

1. An air conditioner that determines a replacement time of a filter, the air conditioner comprising:
    a filter for filtering particles in air that is suctioned;
    a first camera to monitor a state of the filter; and
    a controller for analyzing an image of the filter acquired from the first camera in order to determine a pollution level of the filter,
    wherein the controller is configured to determine a time at which the filter is to be replaced based on at least the pollution level of the filter, and
    wherein the controller is configured to divide the image of the filter acquired from the first camera into a plurality of areas each having a predetermined size, to determine the pollution level for each area, and to generate a replacement alarm signal in response to the number of areas of the filter having pollution levels exceeding a predetermined level being equal to or greater than a predetermined value.

2. The air conditioner according to claim 1, wherein
the controller is configured to determine the time at which the filter is to be replaced based on at least the pollution level of the filter and information about use of the air conditioner during a predetermined period, and
the information about the use of the air conditioner during the predetermined period comprises at least one of a time during which the air conditioner has been operated during the predetermined period, information about an air pollution level sensed by the air conditioner during the predetermined period, or information about the amount of power that the air conditioner has consumed during the predetermined period.

3. The air conditioner according to claim 1, further comprising a receiver for receiving information about an air pollution level of a region in which the air conditioner is installed,
wherein the controller is configured to determine the time at which the filter is to be replaced in further consideration of the information about the air pollution level of the region.

4. The air conditioner according to claim 3, wherein
the receiver receives data about the air pollution level of the region in which the air conditioner is installed that has been cumulatively stored from a past, and
the controller is configured to determine the time at which the filter is to be replaced in further consideration of data about the air pollution level during a predetermined period after an identical date of a previous year to a current date, among the data about the air pollution level of the region that has been cumulatively stored from the past.

5. The air conditioner according to claim 1, further comprising a memory for storing a model trained through machine learning so as to predict the pollution level based on features of the image of the filter, wherein
an image of a polluted filter is divided into a plurality of areas each having a predetermined size, and the model is trained through supervised learning using data having a pollution level value labeled for each area, and
the controller is configured to derive the pollution level of the filter from the image of the filter acquired from the first camera using the model.

6. The air conditioner according to claim 1, wherein
the filter has a cylindrical shape at a center of which a cavity is defined, and
the first camera is disposed in the cavity so as to monitor the state of the filter while being rotated.

7. The air conditioner according to claim 6, further comprising an illuminator disposed in the cavity of the filter so as to illuminate an interior of the filter.

8. The air conditioner according to claim 1, further comprising a second camera disposed so as to monitor an air discharge port of the air conditioner,
wherein the controller analyzes an image of the air discharge port acquired from the second camera in order to determine a pollution level of the air discharge port, and generates a cleaning request signal in response that the pollution level of the air discharge port is equal to or higher than a predetermined level.

9. A method of determining a replacement time of a filter in an air conditioner, the method comprising:
collecting an image of the filter through a first camera to monitor the filter;
determining a pollution level of the filter by analyzing the collected image of the filter; and
determining a time at which the filter is to be replaced based on at least the pollution level of the filter,
wherein the determining the pollution level of the filter comprises dividing the image of the filter collected through the first camera into a plurality of areas each having a predetermined size and determining the pollution level for each area, and
wherein the method further comprises generating a replacement alarm signal in response to the number of areas of the filter having pollution levels exceeding a predetermined level being equal to or greater than a predetermined value, after the determining the pollution level of the filter.

10. The method according to claim 9, wherein
the determining the time at which the filter is to be replaced comprises determining the time at which the filter is to be replaced based on at least the pollution level of the filter and information about use of the air conditioner during a predetermined period, and
the information about the use of the air conditioner during the predetermined period comprises at least one of a time during which the air conditioner has been operated during the predetermined period, information about an air pollution level sensed by the air conditioner during the predetermined period, or information about the amount of power that the air conditioner has consumed during the predetermined period.

11. The method according to claim 9, further comprising receiving information about an air pollution level of a region in which the air conditioner is installed, before the determining the time at which the filter is to be replaced,
wherein the determining the time at which the filter is to be replaced comprises determining the time at which the filter is to be replaced in further consideration of the information about the air pollution level of the region.

12. The method according to claim 11, further comprising receiving data about the air pollution level of the region in which the air conditioner is installed that has been cumulatively stored from a past, before the determining the time at which the filter is to be replaced,
wherein the determining the time at which the filter is to be replaced comprises determining the time at which the filter is to be replaced in further consideration of data about the air pollution level during a predetermined period after an identical date of a previous year to a current date, among the data about the air pollution level of the region that has been cumulatively stored from the past.

13. The method according to claim 9, further comprising:
collecting an image of an air discharge port of the air conditioner through a second camera disposed so as to monitor the air discharge port; and
determining a pollution level of the air discharge port by analyzing the image of the air discharge port collected from the second and generating a cleaning request signal in response that the pollution level of the air discharge port is equal to or higher than a predetermined level.

14. The method according to claim 9, wherein
the filter has a cylindrical shape at a center of which a cavity is defined, and
the first camera is disposed in the cavity so as to monitor the state of the filter while being rotated.

15. The method according to claim 14, wherein
the air conditioner comprises an illuminator disposed in the cavity of the filter so as to illuminate an interior of the filter, and the method further comprises:
  directing the illuminator to an area of the filter to which the first camera is directed.

16. A computer-readable recording medium on which a computer program for allowing a computer to perform the method according to claim 9 is recorded.

17. A computer-readable recording medium on which a computer program for allowing a computer to perform the method according to claim 10 is recorded.

18. A computer-readable recording medium on which a computer program for allowing a computer to perform the method according to claim 11 is recorded.

* * * * *